United States Patent
Carey et al.

(12) United States Patent     (10) Patent No.: US 7,085,756 B2
Carey et al.     (45) Date of Patent: Aug. 1, 2006

(54) METHODS, SYSTEMS, AND COMPUTER PROGRAM PRODUCTS FOR WEB SERVICES

(75) Inventors: James Edward Carey, Rochester, MN (US); Bradley William Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/431,927

(22) Filed: May 8, 2003

(65) Prior Publication Data

US 2004/0225660 A1    Nov. 11, 2004

(51) Int. Cl.
     *G06F 17/30*     (2006.01)
(52) U.S. Cl. .......................... 707/3
(58) Field of Classification Search ............. 707/3, 707/10
See application file for complete search history.

(56) References Cited

U.S. PATENT DOCUMENTS

2002/0174117 A1* 11/2002 Nykanen .................... 707/4

* cited by examiner

*Primary Examiner*—Hosain Alam
*Assistant Examiner*—Joon Hwan Hwang
(74) *Attorney, Agent, or Firm*—Patterson & Sheridan (57) ABSTRACT

A computer-implemented method, system and computer product arranged for use by a requester of data in an environment of coupled requesters and providers, the method comprising, invoking a selection strategy mechanism having one or more replaceable selection strategies, and selecting a provider through operation of the replaceable selection strategy, wherein the replaceable selection strategy is applied while performing one or more search queries directed to the providers.

24 Claims, 8 Drawing Sheets

METHODS, SYSTEMS, AND COMPUTER PROGRAM PRODUCTS FOR WEB SERVICES

BACKGROUND OF THE INVENTION

The present invention relates generally to computer-implemented data processing methods, systems, and computer program products for use in electronic business (e-business) environments. More particularly, it relates to computer-implemented data processing methods, systems, and computer program products for dynamically selecting data of providers by requesters in a coupled environment of requesters and providers.

E-business continues to be a rapidly evolving area of information technology. Typical e-business transactions include the buying and selling of goods over a computer network, such as the Internet. In general, business entities tend to conduct transactions across the Internet with heterogeneous systems, applications, databases, and communication technologies. These Internet type e-business transactions have typically been defined, by person-to-program interactions. For example, such interactions allow individuals to access programs on network browsers. While these networking systems have been revolutionary in many respects, such networking systems nevertheless present several limitations. One such limitation is in regard to integrating application systems across platforms. For example, a business entity may have developed a proprietary application with fixed code. In this situation, other applications are often developed that are related to the fixed code application and, of course, all must communicate to one another, thereby necessitating continuing updates. This is of particular economic significance in the context of business environments that often involve numerous application modifications. Accordingly, the integration of e-business applications across differing platforms presents a significant obstacle in terms of continuing its rapid growth.

Until recently, the Internet, as architected above, has supported the vast majority of commercial e-business usage. However, it has become commercially desirable that Internet and computing standards be expanded beyond just typical e-business transactions, and encompasses e-business when you need it, or stated somewhat differently e-business on demand.

In this regard, web services are emerging as tools for use on the Internet for creating next generation distributed data processing systems. Essentially, web services involve business and consumer applications that enable heterogeneous computer systems to communicate seamlessly over a network; especially in a manner whereby cross platform application integration occurs. Such web services typically rely on standard technology, such as XML and Simple Object Access Protocol (SOAP). The messages are communicated in an XML format and conducted through with the network-neutral SOAP. As a result, web services provide an approach for unifying integration of a wide variety of computers and software that are involved in e-business. Use of this approach facilitates program-to-program interactions without requiring user-to-program interactions and this presents, of course, significant advantages.

In a typical web services business transaction, a service requester application queries a web services registry by specifying functions and seeking a registered provider of such services. The web services providers typically publish (e.g., advertise) the services they are making available with a standard encoding called Web Services Description Language (WSDL). The web services requester retrieves the stored information from the registry, including how to connect to the web services provider. Then once a selection occurs, a requester's application and a provider's application communicate for establishing a business transaction.

However, in certain web services situations, it is not always possible to find a web service that exactly matches requested search attributes. For example, a requester application may designate attributes for services and/or information that the web services requester deems mandatory as opposed to optional. The requester application communicates through the web registry and is typically given the option of selecting a web services provider that has an optional or informational set of service attributes even though the requested attribute is considered mandatory. By selecting the requested mandatory transaction attribute as part of an optional set of transactions provided by the provider, the requester is faced with accepting, as optional, those attributes requested to be mandatory. If the attribute is truly mandatory, then this services provider cannot be used. However, it is often the case that the mandatory attribute is only needed some of the time. Hence, using a services provider that provides more than is actually needed is clearly costly and less than entirely desirable given that differing costs (e.g., fees) are typically associated with the differing kinds of services provided.

Therefore, without the ability to provide a web services arrangement having the ability to dynamically select and accept variability in the kinds of services that are accessed by a customer or web services requester, the true potential of web services is diminished.

SUMMARY OF THE INVENTION

The present invention provides improvements over the prior art by providing a replaceable selection strategy arrangement wherein a system, method, and computer program product are operable for allowing a requester to select a provider having services with the desired attributes from among a plurality of providers in an environment of coupled requesters and providers. The selection strategy mechanism can be implemented through a variety of approaches.

In an illustrated embodiment, the selection strategy mechanism is dynamically selective.

In an illustrated embodiment, the selection strategy mechanism is operable in a web services environment.

In an illustrated embodiment, the selection strategy mechanism is operable for loosely coupled requesters and providers in a web services environment.

In an illustrated embodiment, the selection strategy mechanism is parametized with definitions of strategies for selecting service attributes to be selected.

An aspect of the present invention is that it provides a significant improvement over the prior art which does not allow for the selection of differentiated search attributes in accordance with desired search parameters in a coupled environment of web services providers and web services requesters.

Another aspect of the present invention is that it provides for the foregoing in a reliable and efficient manner.

These and other features and aspects of the present invention will be more fully understood from the following detailed description of the preferred embodiments, which should be read in light of the accompanying drawings. It should be understood that both the foregoing generalized description and the following detailed description are exemplary, and are not restrictive of the invention.

BRIEF DESCRIPTION OF THE DRAWINGS

For a more complete understanding of the present invention, reference is now made to the following detailed description of a preferred embodiment of the present invention illustrated in the accompanying drawings in which.

DETAILED DESCRIPTION

Reference is made to FIGS. 1–6A–C for illustrating one preferred embodiment of a networked computer system 100 for implementing processing in accordance to the adaptive selection of web services. The networked computer system 100 is, preferably, in a web services environment of web services providers and requesters, wherein a requester dynamically selects services of a provider through application of a web services selection strategy mechanism. While this invention relates to providing web services, it is broadly related to dynamically selecting data of providers by requesters in an environment of coupled requesters and providers.

Figure 1:
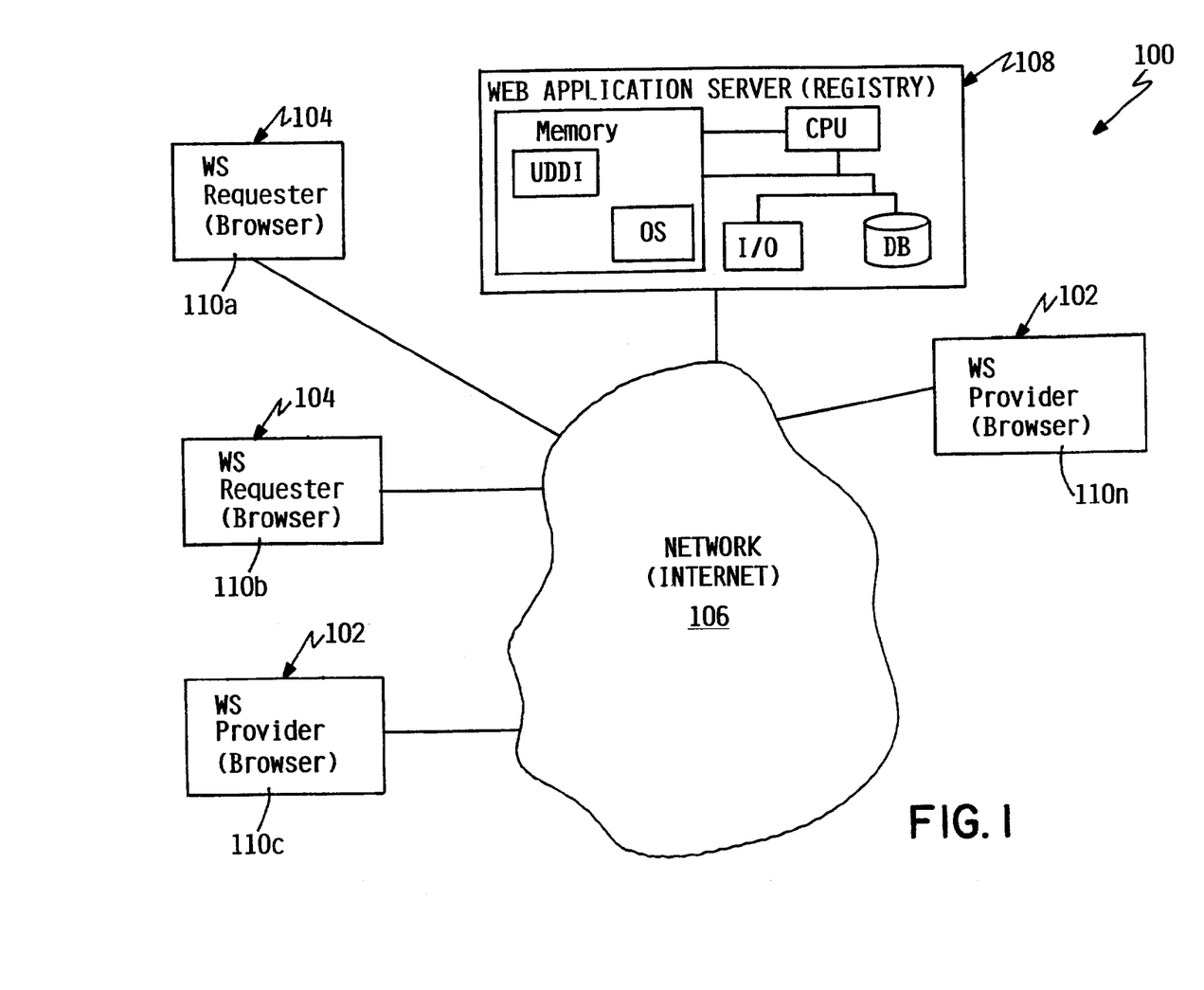
FIG. 1 is a graphical representation of a Web services computer network embodying the principles of the present invention.

FIG. 1 illustrates one preferred embodiment of a heterogeneous networked computer system 100 comprising one or more web services (WS) providers 102 and one or more web services (WS) requesters 104 that are linked by appropriate bi-directional communication lines into an environment or network 106 of coupled providers and requesters. Although, the network 106 is, preferably, the Internet (World Wide Web), other networks, such as local-area networks (LAN's), wide-area networks (WAN's), or the like are contemplated, including wireless networks. The network 106 can use any of the appropriate network protocols and, in terms of the Internet, any standard Internet protocol including those to be developed in the future. While the network 106 includes a web services registry 108, such network need not include such a registry. The network 106 is preferably loosely coupled and is designed across modules to reduce the interdependencies across modules or components. A loosely coupled environment increases flexibility in adding modules, replacing modules and changing operations within modules. The term loosely coupled is one that means the provision of protection of other parts of a distributed system from changes in an individual node so that enterprises need not tightly couple their technology. Also, while a network as noted is illustrated, it will be appreciated that a stand-alone computer system to which the services requesters and providers are tightly coupled is also envisioned. The networked computer system 100 comprises a plurality of workstations and/or computer systems 110a–n (collectively, 110) that are linked across the network 106. Also, the computer systems 110 include appropriate networking interfaces. The network connections are envisioned to be those used today as well as contemplate those of the future.

Figure 2:
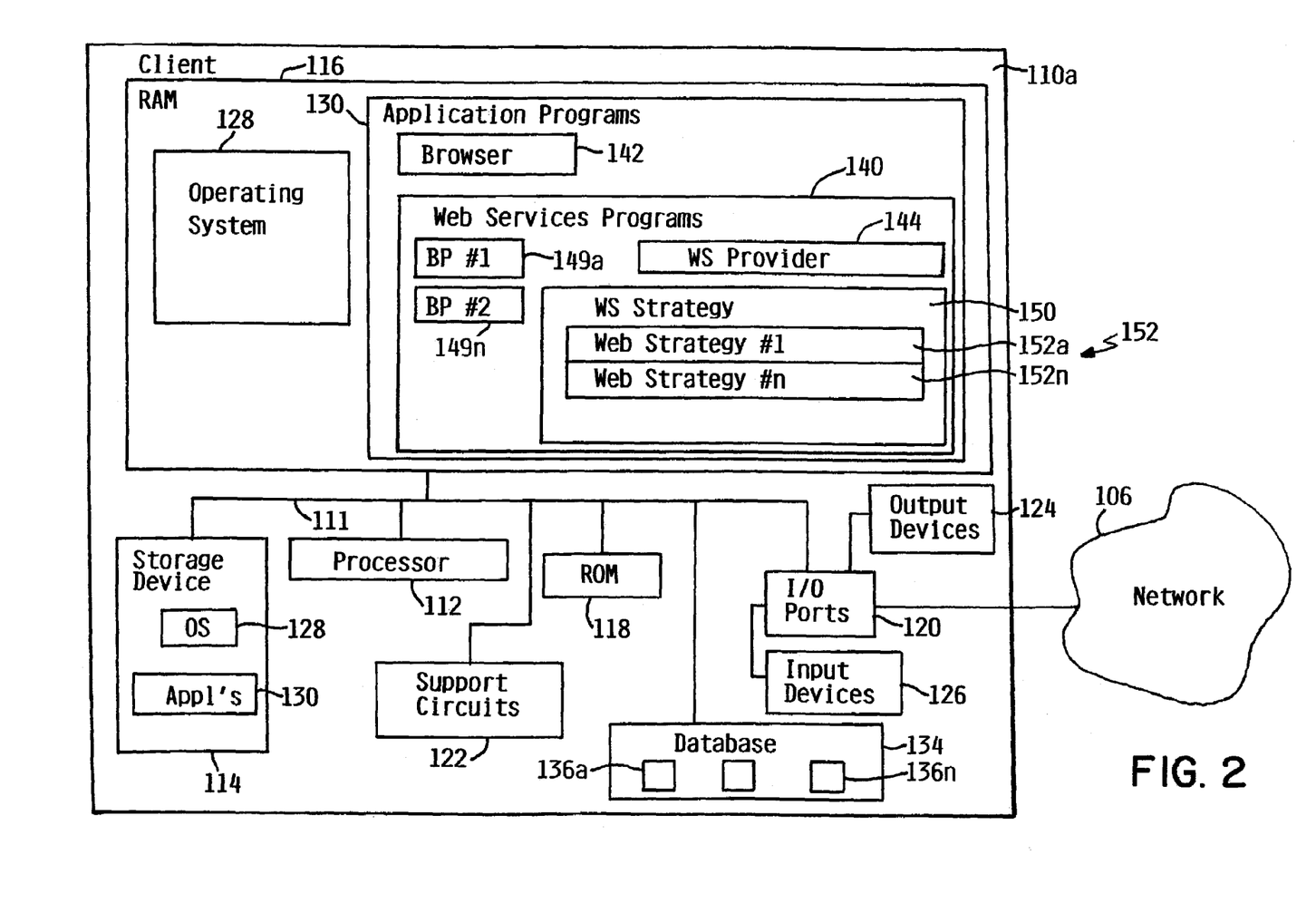
FIG. 2 is a schematic view representative of hardware embodying the principles of the present invention.

Referring to FIG. 2, there is illustrated one of many preferred embodiments of a computer system 110 that can be used by a web services requester and/or a web services provider. The computer system 110 may be any type of computer or other programmable electronic device including a client computer, a server computer, a PC-based server, a minicomputer, a midrange computer, a mainframe computer, or the like. As will be explained, a selection strategy mechanism is provided that is operable for dynamically allowing a requester to select data having desired attributes from, preferably, one of a plurality of providers in an environment of coupled requesters and providers.

The computer system 110 can be an eServer iSeries, commercially available from International Business Machines of Armonk, N.Y. A system interconnect bus 111 is depicted to which various components are coupled and communicate with each other. Coupled to the system interconnect bus 111 is at least a single processor unit 112, storage device 114, random access memory (RAM) 116, read only memory (ROM) 118, input/output (I/O) ports 120, and other support circuits 122. The ROM 118 typically controls basic hardware operations. Furthermore, one or more output devices 124, such as a display, as well as one or more user interface input devices 126, such as a keyboard and/or pointing device is respectively coupled to the I/O ports 120. In known fashion, the output and input devices 124 and 126; respectively, permit user interaction with the computer system 110. The processor unit 112 may be an IBM Power PC™ processor or the like. It is operable for sending and receiving instructions and data information to and from each of the computer system's components coupled to the system interconnect bus 111 and performs system operations based upon the requirements of the computer system's operating system (OS) 128, and other specialized application programs, collectively referred to as application programs 130. Referring to the operating system 128, it can be a multi-tasking operating system, such as OS/400 that is commercially available from International Business Machines Corporation, Armonk, N.Y. Those skilled in the art will appreciate that the spirit and scope of the present invention are not limited to a particular operating system and can include other suitable types.

The storage device 114 can be a permanent storage medium, such as a hard disk, CD-ROM, tape, or the like. The RAM 116 is volatile memory (e.g., SRAM, DRAM, or the like). The contents of the RAM 116 may be retrieved from the storage device 114 as required. Illustratively, the RAM 116 is shown with the operating system 128 and application programs 130 concurrently stored therein. The program codes of the operating system 128 and/or application programs 130; respectively, are sent to the RAM 116 for temporary storage and subsequent execution by the processor unit 112. The RAM 116 is capable of storing files from the operating system 128, as well as files from one or more application programs. The executable and library files (not shown) of the operating system 128 and application programs 130 are individually transferred from the storage device 114 to the RAM 116 for processing as needed. The transfer of the executable files may be controlled by a memory management system (not shown).

For a web services provider, provision is made for a relational type of distributed database 134 connected to the system and under the control of the processor. A relational database management system is a computer database management system (DBMS) controlling the storing and retrieving of data to database files 136a–136n (collectively, 136). The database files 136 contain detailed information of the services or functions being provided including fee structures and whether the services or functions being published to the web services registry 108 have attributes of being mandatory or required, optional, or informational. Clearly, the invention envisions a variety of data having differing attributes.

The computer system 110 includes in its grouping of application programs 130 a web services requester application or mechanism 140 and a browser 142. The web services requester application 140 is operable for generating SOAP (Simple Object Access Protocol) requests and transmitting them to web services providers either directly to other web services providers through a web services registry 108. SOAP is a set of rules that facilitate the XML exchange between the one or more applications of the web services requesters and one or more providers. The web services requester mechanism or application 140 receives and interprets the responses from the web services provider, as will be described. Also, the web services requester application 140 can be a plug-in type for legacy applications. Such legacy applications would be converted to a web services environment by adding functions to handle SOAP and WSDL. In another preferred embodiment, the browser 142 could be used in a client-server embodiment, wherein the browser would interact with the web services requester application 140 on an application server. The browser is operable to allow a requester to employ, for example, a wizard created by the web services registry 108 to access registries in the web application server. In addition, the computer system 110 can integrate multiple web services by being a requester and a provider with the addition of a web services provider application or mechanism 144. The web services provider application 144 communicates with the web registry for binding with the web services requester application 140 and business process applications 149a–n (collectively, 149). The business process applications 149 provide the business logic for carrying out different kinds of business processes. Clearly, such business process applications can encompass business logic applications to be entertained in a web services environment.

Reference is now made to the selection strategy application or mechanism 150, which is operable for establishing dynamic selection of services published to the network by the web services providers while performing one or more selection queries directed at the services of the providers. The web search selection strategy mechanism 150 has one or more strategy modules 152a –n (collectively, 152), which are configured to include respectively different search strategy routines that are dynamically replaceable for selecting a web services provider from registered providers listed on the web services registry 108. Each of the strategy modules 152 are dynamically replaced based on the particular business process application 149 deployed. The system or user can invoke the business process application(s). The business process application(s) in turn communicates with the modules and thereby dynamically selects the one or more replaceable strategies included in the invoked module. In this regard, each of the modules includes an interface that is defined in a well-known manner so that each of the business applications can dynamically invoke the module and thereby the selection strategies thereof. Operators might also intervene to select the desired module through a user interface (not shown). The service selections are based on the particular strategies of the particular replaceable module in use. The modules are configured to include one or more search parameters defining search strategies that are of interest to a particular business application invoked.

Reference is made back to the web services registry 108 (see FIG. 1). The web services registry 108 in the preferred embodiment can be a Universal Description, Discovery and Integration (UDDI) business web services registry. The web services registry 108 is, preferably, a global, public, online directory that allows businesses a uniform way to describe their services, discover other companies' services, and understand the methods necessary to conduct e-business with another company. Essentially, the UDDI web services registry contains listings of providers and each listing contains categories of services provided by each provider; much as does a yellow pages telephone directory. Basically, the UDDI registry provides an XML interface for allowing a web services requester access to the shared directory and allows publishing of the services of the web services providers. The UDDI Business registry of this embodiment is an implementation based on a set of UDDI specifications (e.g., UDDI v.2, v.3). Of course, other future versions can be used. The web services registry 108 can be operated using an eServer iSeries computer system commercially available from International Business Machines Corporation, Armonk, N.Y. In particular, it can be the Web Sphere Application Server (WAS) V4.0 or V5.0 that is commercially available from International Business Machines Corporation and is used as a single application server. As known, the web services registry uses an application that allows creation of web pages for allowing web service requesters to define the several attributes of the request that are inputted. While a web services type environment is preferred, other systems for linking service resources on demand are contemplated. These attributes relate to the kinds of goods and services, information, etc. which the web services requester desires and, of course, is usable in the system. For example, the web services requester requests information for its specific business applications. In this example, the information is about car types including vehicle identification numbers (VIN's) for vehicles to be used in an insurance program. The type of strategy module is also selected based, for example, on the kind of business application selected.

Reference is now made to the web services provider applications 144. In the illustrated embodiment, the web services provider's computer system 110 includes web services provider applications 144 that operate in a known manner, whereby the existence of the web services providers IS established and their services and capabilities are listed and published to the web services registry 108 for enabling searching, selection, and subsequent binding by the web services requesters. The web services provider applications 144 are, preferably, resident in a stand-alone environment or on a client system. Only those aspects of the web services provider applications 144 pertinent for understanding the web strategy mechanisms will be set forth. The web services providers publish the services by making them available with a standard encoding called Web Services Description Language (WSDL). In this embodiment, the provider application uses WSDL for creating files that include: a services interface definition and a services implementation definition. The set of service attributes to be searched include required or mandatory, optional, and informational. Each of the services (required, optional, and informational) or part of them has a different fixed cost associated with them. Accordingly, a requester can differentiate the type of services desired and not pay for services that are unnecessary.

Figure 3:
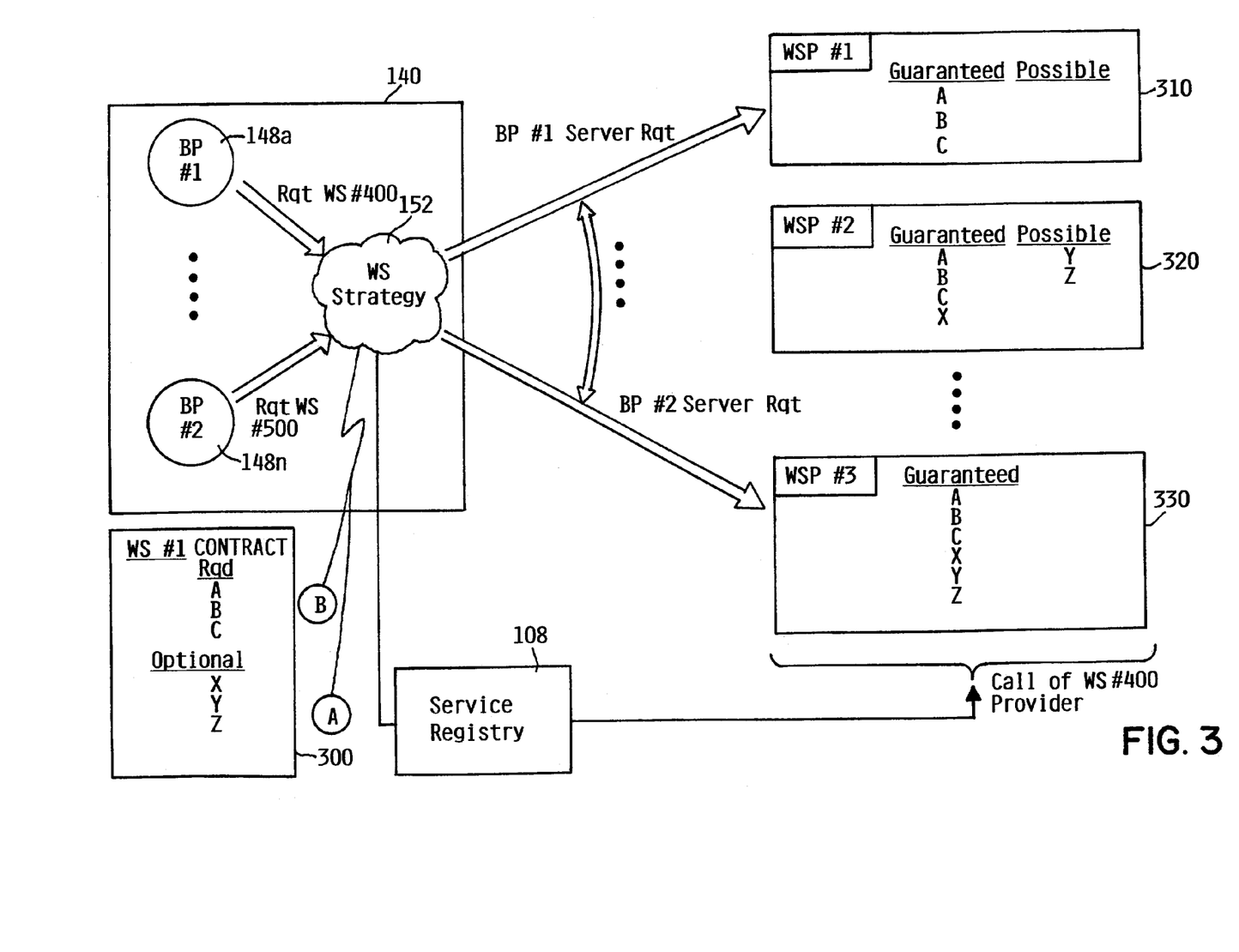
FIG. 3 is a schematic representation of the web services processes according to the present invention.

FIG. 3 is a schematic of a service selection process of this invention, wherein a web services requester desires to select one or more services or functions that match the parametized search strategies of the requester. The service(s) or function(s) being searched by the requester can be critical or thus mandatory. Accordingly, web services providers listing a service or function (e.g., data regarding a type of car) will always be selected by a web services requester when searched. However, the previously noted attributes may at times be considered non-mandatory. Hence, it is advantageous in some business applications to select services having just non-mandatory attributes as opposed to also including services having mandatory attributes. Alternatively, the searches can include both mandatory and non-mandatory attributes depending on particular web strategy. The particular web strategy mechanism of this invention adapts to a particular set of services and attributes thereof. The web strategy mechanism enables the business process applications to handle data having a variety of attributes including associated costs.

In this example, a web services requesters is interested in establishing a web services contract 300 related to, for example, an insurance contract for automobiles. The web services contract 300 requires as mandatory services or Functions A (e.g., year of car), B (e.g. model of car), C (e.g., age of insured), but consider Functions X (e.g., address of insured), Y (e.g., VIN), and, Z (e.g., history of accidents) as optional. It is envisioned that the services or functions can relate to other kinds of transactional events. For instance, a web services provider 310 published that it provides only Functions A, B, C as guaranteed or mandatory if a selection is made; whereas, the web services provider 320 may have published that Functions A, B, C are guaranteed or mandatory if a selection is made, as well as Function X, but also that Functions Y and Z are optional if the web services providers selected. The web services provider 330 may have published that Functions A, B, C, X, Y, Z are guaranteed or are mandatory if selected. In this example, the search is conducted for a web services provider having Functions A, B, C as mandatory and Functions X, Y, Z as optional. If the web selection strategy mechanism is in a stand-alone mode, the search of all the web services providers is conducted directly by the web services requester using the selection strategy until a match is found. If the web strategy mechanism is coupled through the registry, then the registry performs the search until a match is found. In either case, after a match, a binding contract can be established by the web services requester selecting the selected services being provided by the web services provider.

Figure 4:
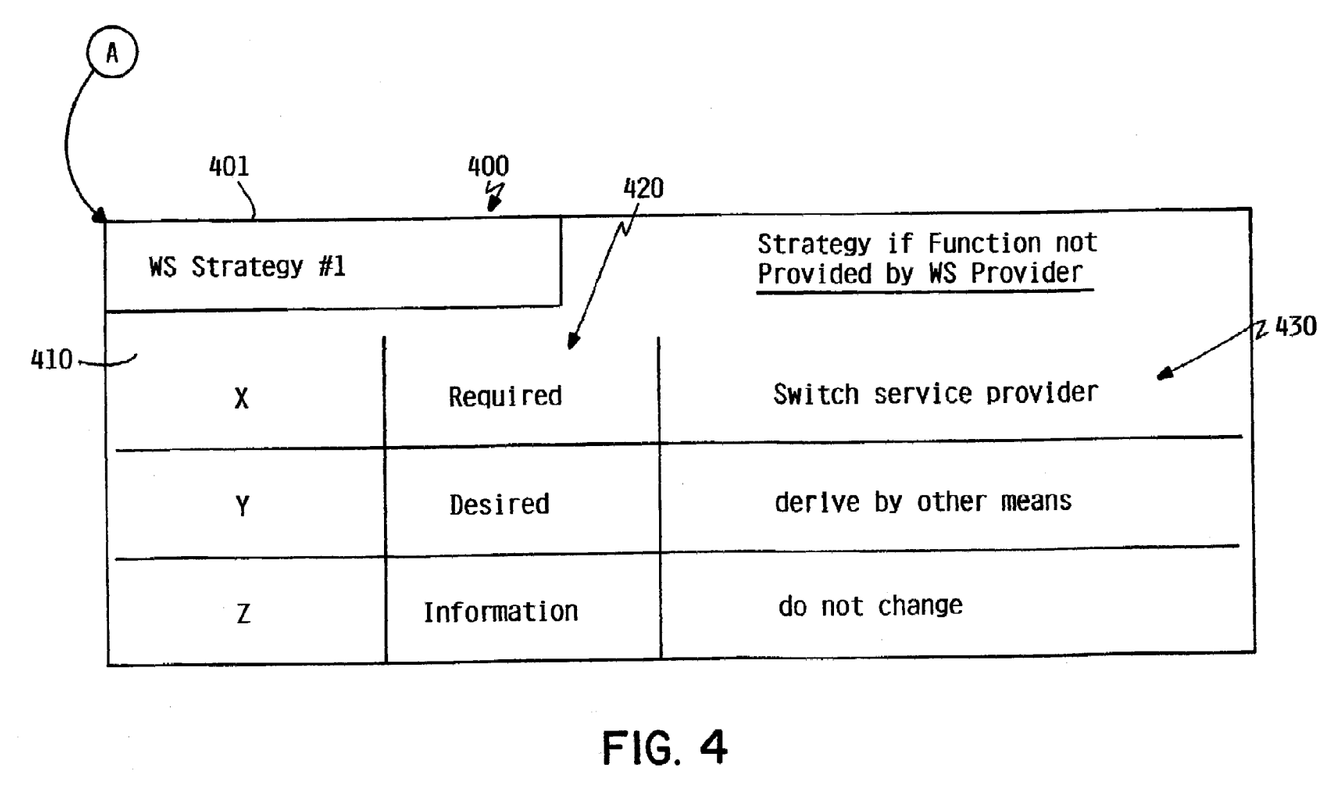
FIG. 4 is a representation of one preferred embodiment of a web strategy Table according to the present invention.
Figure 5:
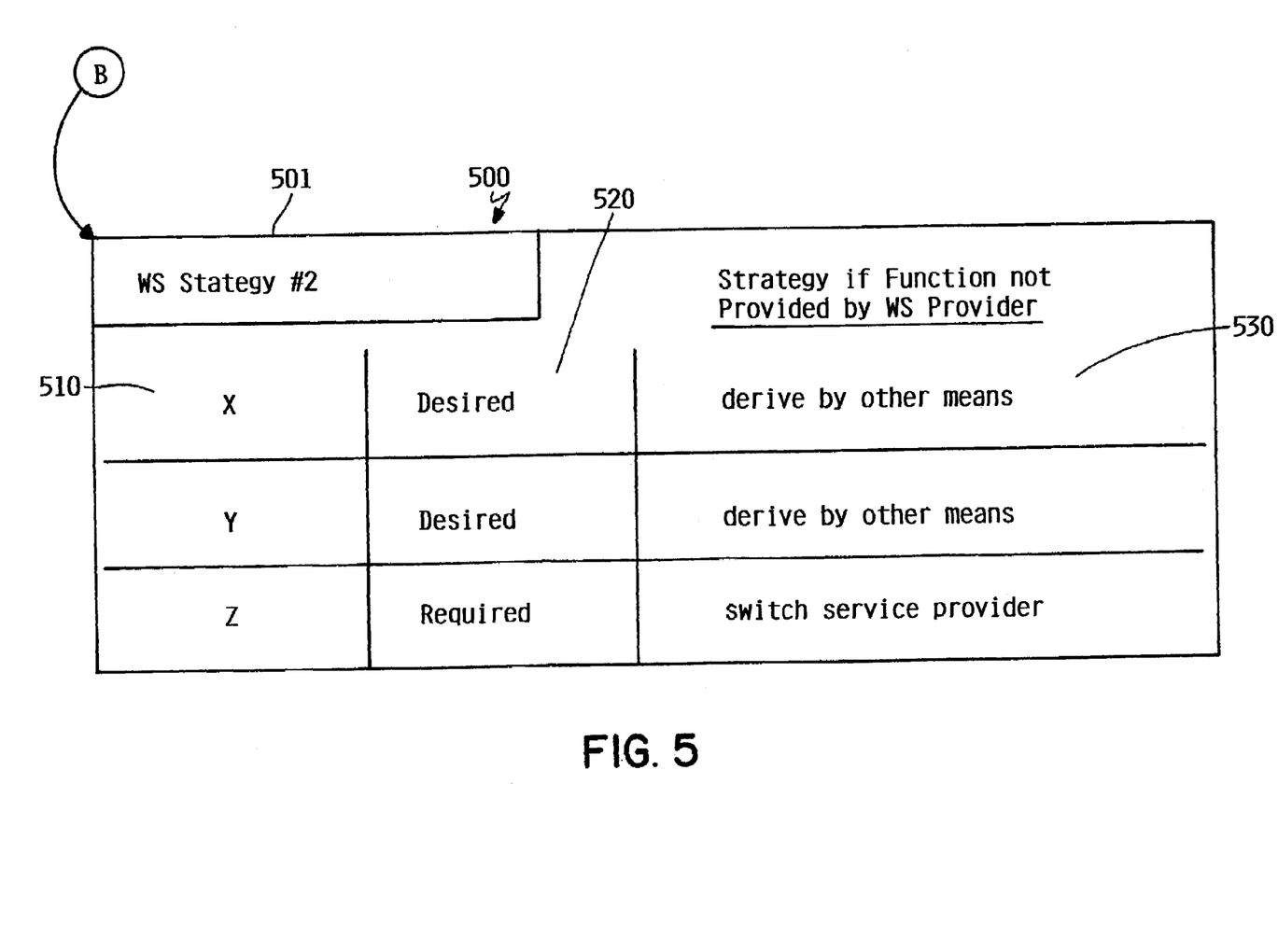
FIG. 5 is a representation of another preferred embodiment of a web strategy Table according to the present invention.

Continuing the example, reference is now made to FIGS. 4 and 5 for illustrating different web search strategies 400 and 500 associated with the strategy modules 152a, n; respectively, and the outcomes of such strategies should a particular function being searched be not provided by the a web services provider. The following strategies are only exemplary. It is to be understood that the present invention encompasses a wide range of parameters for respective functions as well as strategies for handling the functions. The following Tables are exemplary of the kind of functioning to be performed.

In Table 401, column 410 lists a variety of functions, such as Functions X, Y, and Z that are to be searched that are associated with the strategy module 152a. For instance, Function X (e.g., address of insured) is listed as being a required or mandatory function. Function Y (e.g., VIN) is listed as being preferable or desired, and, Function Z is listed as being of interest as being informational (e.g., history of accidents). Column 420 lists the search attributes or priorities associated with each parametized function, such as required, desired, or informational. Other attributes and parameters are contemplated. Column 430 lists the outcomes, such as "switch web services provider", "derive by other means", "do not change selected provider", should a web services provider not provide the Functions being searched. In this instance, if the Function X were not matched in the search with a particular web services provider, then the strategy module 152a would seek another web services provider for obtaining this required function. If the Function Y is not matched with a particular web services provider in the search, then the web search module would indicate to the web services program that some other known tool (not shown and not forming part of the invention) could be used to derive or obtain data for Function Y without the necessity of switching the web services provider selected. If the Function Z is not matched, then the search strategy will indicate that the web services provider selected is adequate and the process will continue without changing the web services provider.

In Table 501, column 510 lists a variety of functions, such as Functions X, Y, and Z that are to be searched that are associated with the strategy module 152n. For instance, Function X (e.g., address of insured) is listed as being a preferable or desired function. Function Y (e.g., VIN) is listed as being preferable or desired, and, Function Z is listed as being required (e.g., history of accidents). Column 520 lists the search parameters associated with each function, such as required or desired. Other search parameters can be provided. Column 530 lists the outcomes brought about, such as switch web services provider, derive by other means; do nothing, should the function being searched for not be provided by a web services provider. For instance, if the Function X is not matched in the search with a particular web services provider, then the web search mechanism would indicate that some other tool or means be used to obtain data for Function Y without switching the selected web services provider. If the Function Y is not matched in the search with a particular web services provider, then the web search module would indicate that some other means be used to obtain data for Function Y without the need for switching the web services provider. If the Function Z is not matched, thereby indicating that function is not provided by the web services provider then the search module would indicate that some other tool or means be used to obtain data for Function Z without switching the selected web services provider.

Figure 6A:
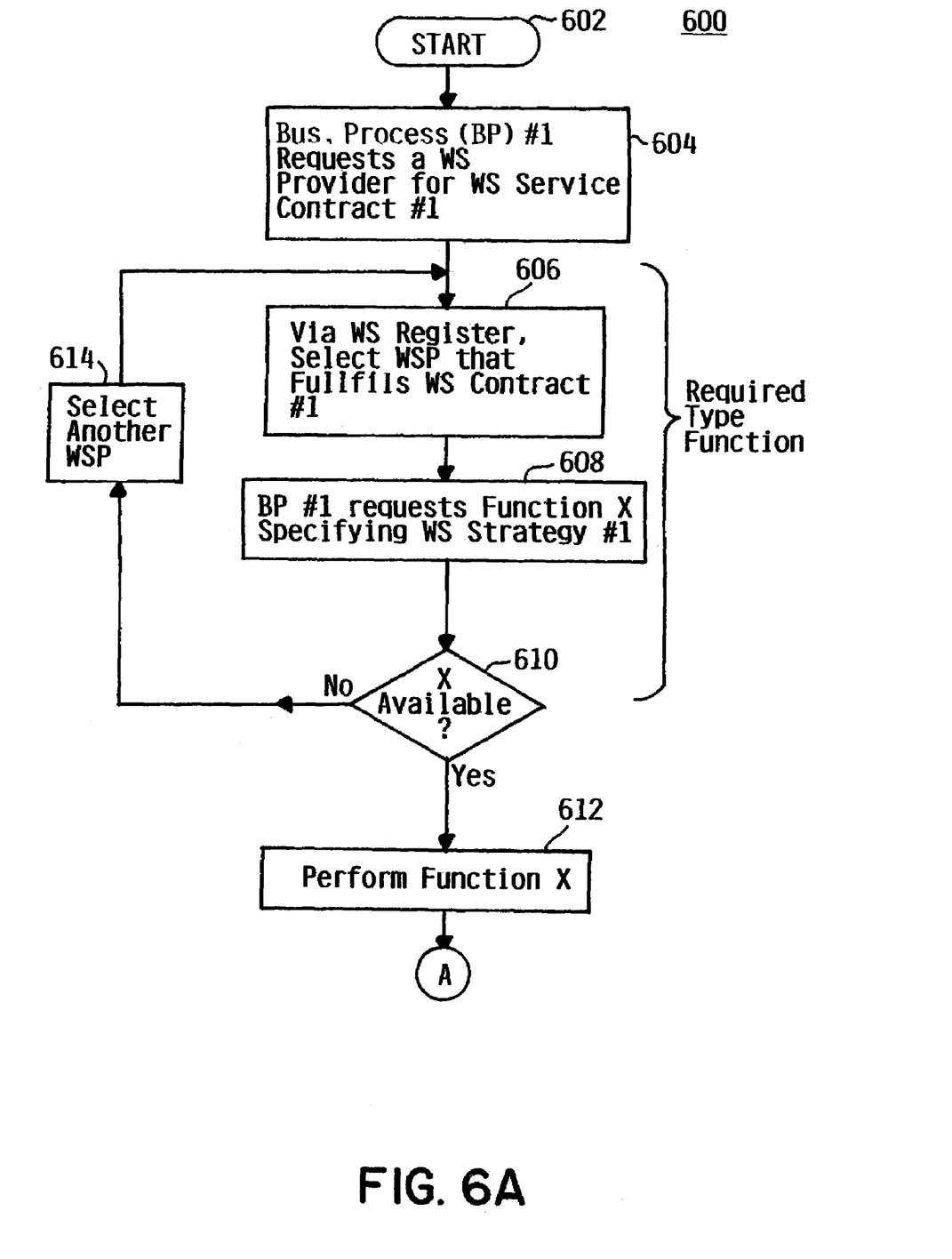
FIGS. 6A–C illustrate flow diagrams of preferred steps in implementing the selection strategy process of this invention.
Figure 6B:
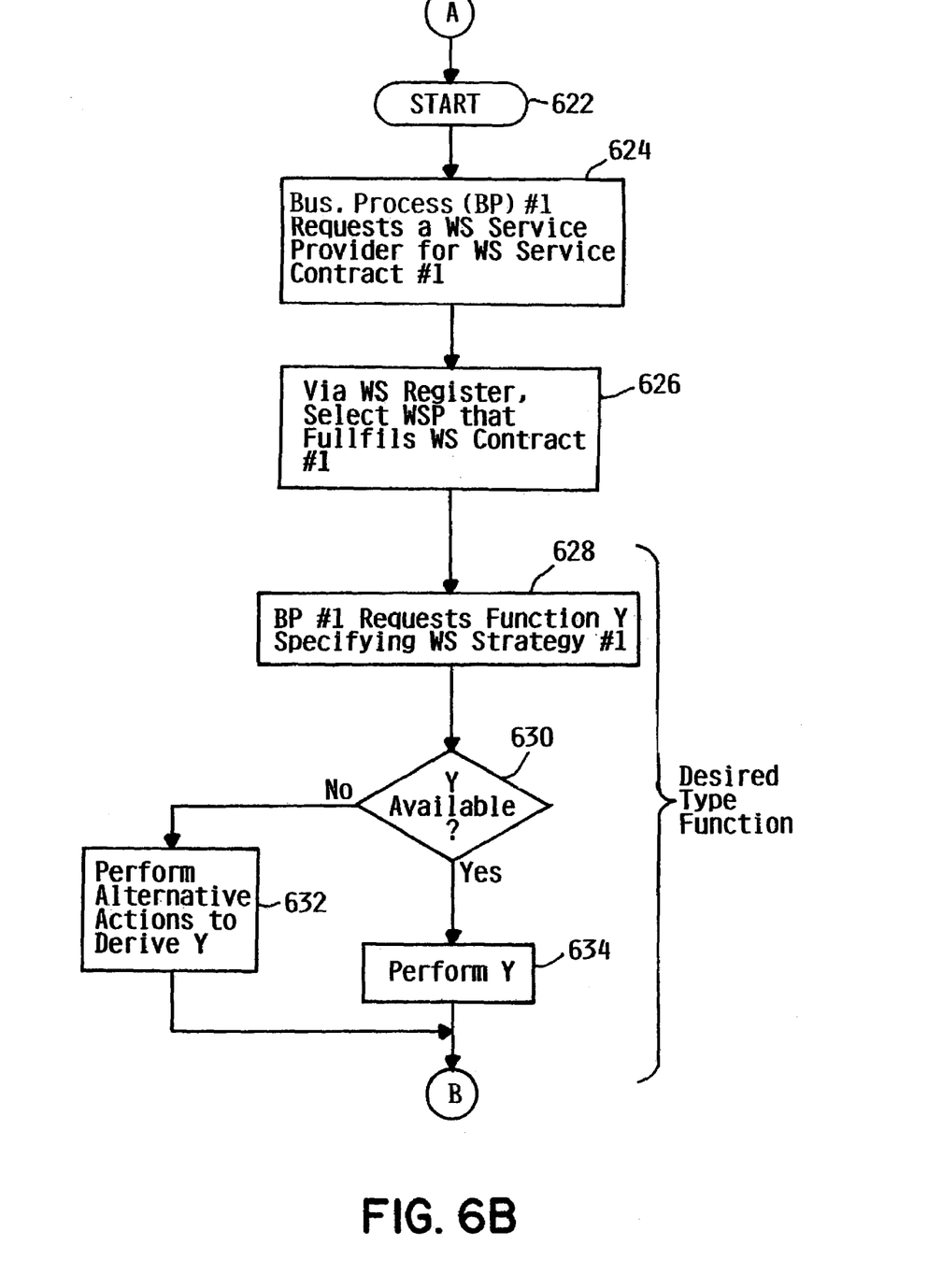
Figure 6C:
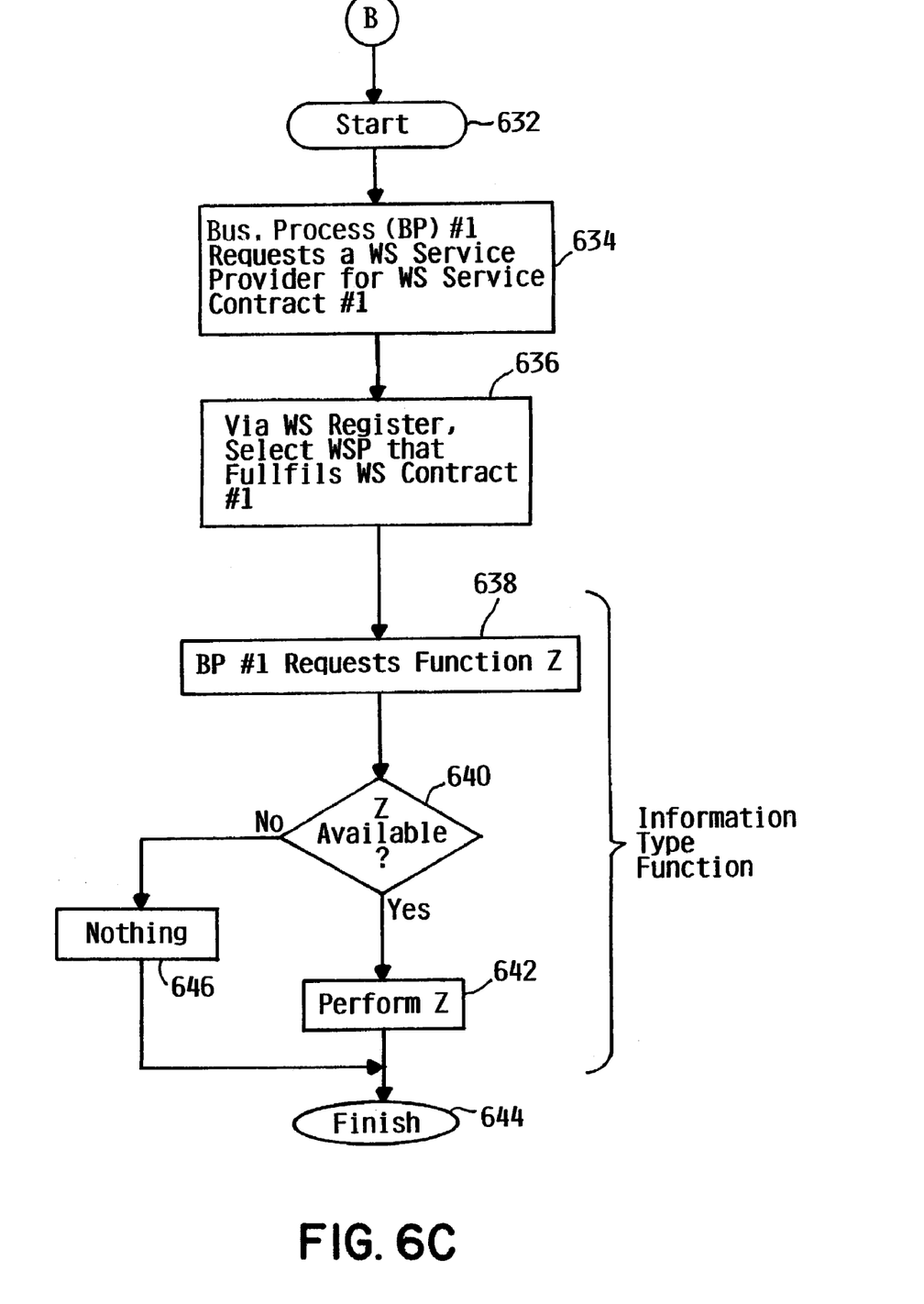

Reference is now made to FIGS. 6A–C for illustrating one preferred implementation of a web services selection process 600 of the present invention. In this embodiment, the business process application starts at step 602. At step 604, the business process application 149 and the strategy module 152 are invoked. As noted above, a search query is transmitted to the web services registry 108. The search request of the invoked business process application 149 includes searches for Functions A, B, C, each of which has attributes associated with the services being searched. As a result, the business process application dynamically selects the strategies of the strategy module 152a. Once the business applications and a strategy module are invoked as noted above the search requests are transmitted to the web services registry 108. At step 606, the web services registry conducts a search of its listings for fulfilling the search. Typically, the search results will provide web services providers that fulfill the searched Functions A, B, C. These search results are transmitted from the web services registry back to the strategy module 152a. At step 608, the web search strategy mechanism 150 is operable for requesting Function X; see the strategy Table 401 in FIG. 4. Following step 608, the process proceeds to step 610 whereat a determination is made as to whether the web services provider has the Function X. If Yes, then step 612 follows wherein the Function X is performed by means not forming part of the present invention. If No, then the step 614 is performed whereby the process returns to step 606 for initiating another search.

Reference is made to FIG. 6B for illustrating another aspect of the web services selection process 600. In this embodiment, the initial steps 622–626 are similar to the steps 602–606 so a discussion of their operations is self-evident. At step 628, the business process application 149 can request Function Y s specified in the dynamically selected strategy module 152a. As noted from the strategy Table 401, (FIG. 4) the Function Y is associated with a desired search parameter. Step 630 follows step 628, whereat a determination is made is made as to whether or not the Function Y is available from the selected web services provider. If Yes, then step 630 follows whereat the Function Y is performed. After the Function Y is performed, the process terminates at step 634. If No, at step 628, then step 632 follows, whereby alternative actions to derive Function Y are performed by known means not forming part of this invention. For example, the strategy module could contact a new web service, default settings could be used or other values used.

Reference is now made to FIG. 6C for illustrating another aspect of the process 600. In this embodiment, the initial steps 632–636 are similar to the steps 602–606 so a discussion of their operations is self-evident. At step 638, the business process application 149 can request Function Z specifying the strategy module 152a. At step 638, the business process application 149 can request Function Z as specified in the dynamically selected strategy module 152a. As noted from the strategy Table 401, (FIG. 4) the Function Z is associated with a desired search parameter. Step 640 follows step 638, whereat a determination is made is made as to whether or not the Function Z is available from the selected web services provider. If Yes, then step 642 follows, whereat the Function Z is performed. After the Function Z is performed the process terminates at step 644. If No, at step 638, then step 646 follows wherein the process is allowed to continue without interference. The process then proceeds to step 644 wherein the process terminates.

The embodiments and examples set forth herein were presented to best explain the present invention and its practical applications and to thereby enable those skilled in the art to make and use the invention. However, those skilled in the art will recognize that the foregoing description and examples have been presented for the purposes of illustration and example only. The description set forth is not intended to be exhaustive or to limit the invention to the precise forms disclosed. In describing the above-preferred embodiments illustrated in the drawings, specific terminology has been used for the sake of clarity. However, the invention is not intended to be limited to the specific terms selected. It is to be understood that each specific term includes all technical equivalents, which are known to operate in a similar manner to accomplish a similar purpose as well as those equivalents that are unforeseeable. Other modifications and variations are possible in light of the above teachings without departing from the spirit and scope of the appended claims.

What is claimed is:

1. A computer implemented method for selecting a web services provider, comprising:
   for a given business process, selecting a predifined strategy module from a set of predefined strategy modules, wherein each predifined strategy module comprises:
   (a) one or more search parameters; and
   (b) a search strategy for each parameter to identify web services providers satisfying the parameter, wherein the search strategy comprises:
      (i) a priority for the parameter; and
      (ii) an action to be performed if the parameter is not satisfied by a given web services provider; and
   querying a web services registry for a web services provider based on the one or more parameters of a selected predefined strategy module to identify one or more desired web services provider, wherein the web services registry comprises a list of web services providers and services provided by each web services provider, wherein the web services registry is a Universal Description, Discovery, and Integration registry.

2. The method of claim 1, wherein the one or more parameters are web services implemented to complete the business process.

3. The method of claim 1, wherein the action comprises one of:
   selecting a different web service provider if the parameter is not satisfied by the given web services provider; and
   ignoring the parameter if the parameter is not satisfied by the given web services provider.

4. The method of claim 1, wherein the priority identifies the respective parameter as one of:
   required, wherein the respective parameter must be satisfied in order to qualify a web services provider for the business process;
   desired, wherein satisfaction of the respective parameter is preferred but not necessary to qualify a web services provider for the business process; and
   informational, wherein satisfaction of the respective parameter may be ignored.

5. The method of claim 1, further comprising programmatically selecting the predefined strategy module based on the business process without user input selecting the predefined strategy module.

6. The method of claim 1, further comprising responsive to each query, receiving one or more web services providers satisfying the respective parameters of the respective selected strategy module from the web services registry.

7. The method of claim 6, further comprising selecting another predefined search module and determining whether the one or more web service providers satisfy parameters of the other predefined search module to identify a web services provider for the business process.

8. A computer readable storage medium containing a program for selecting a web services provider which, when executed performs operations comprising:
   for a given business process, selecting a predefined strategy module from a set of predefined strategy modules, wherein each predefined strategy module comprises:
   (a) one or more search parameters; and
   (b) a search strategy for each parameter to identify web services providers satisfying the parameter, wherein the search strategy comprises:
      (i) a priority for the parameter; and
      (ii) an action to be performed if the parameter is not satisfied by a given web services provider; and querying a web services registry for a web services provider based on the one or more parameters of a selected predefined strategy module to identify one or more desired web services providers, wherein the web services registry comprises a list of web services providers and services provided by each web services provider, wherein the web services registry is a Universal Description, Discovery, and Integration registry.

9. The computer readable storage medium of claim 8, wherein the one or more parameters are services implemented by the business process.

10. The computer readable storage medium of claim 8, wherein the action comprises one of:
selecting a different web service provider if the parameter is not satisfied by the given web services provider; and
ignoring the parameter if the parameter is not satisfied by the given web services provider.

11. The computer readable storage medium of claim 8, wherein the priority identifies the respective parameter as one of:
required, wherein the respective parameter must be satisfied in order to quality a web services provider for the business process;
desired, wherein satisfaction of the respective parameter is preferred but not necessary to qualify a web services provider for the business process; and
informational, wherein satisfaction of the respective parameter may be ignored.

12. The computer readable storage medium of claim 8, wherein the operations further comprise programmatically selecting the predefined strategy module based on the business process without user input selecting the predefined strategy module.

13. The computer readable storage medium of claim 8, wherein the operations further comprise responsive to each query, receiving one or more web services providers satisfying the respective parameters of the respective selected strategy module from the web services registry.

14. The computer readable storage medium of claim 13, wherein the operations further comprise selecting another predefine search module and determining whether the one or more web service providers satisfy parameters of the other predefined search module to identify a web services provider for the business process.

15. A system for selecting a web services provider, comprising:
a set of predefined strategy modules resident in a memory device, wherein each predefined strategy module comprises:
(a) one or more search parameters; and
(b) a search strategy for each parameter to identify web services providers satisfying the parameter, wherein the search strategy comprises:
(i) a priority for the parameter; and
(ii) an action to be performed if the parameter is not satisfied by a given web services provider; and
a web services requester application configured to perform an operation comprising:
for a given business process, select a predefined strategy module from the set of predefined strategy modules; and
issue a query against a web services registry for a web services provider based on the one or more parameters of a selected predefined strategy module to identify one or more desired web services providers, wherein the web services registry comprises a list of web services providers and services provided by each web services provider, wherein the web services registry is a Universal Description, Discovery, and Integration registry.

16. The system of claim 15, wherein the one or more parameters are services implemented by the business process.

17. The system of claim 15, wherein the action comprises one of:
selecting a different web service provider if the parameter is not satisfied by the given web services provider; and
ignoring the parameter if the parameter is not satisfied by the given web services provider.

18. The system of claim 15, wherein the priority comprises one of:
required, wherein the parameter must be satisfied in order to qualify a web services provider for the business process;
desired, wherein satisfaction of the parameter is preferred but not necessary to qualify a web services provider for the business process; and
informational, wherein satisfaction of the parameter may be ignored.

19. The system of claim 15, wherein the web services requester is further configured to programmatically select the predefined strategy module based on the business process without user input selecting the predefined strategy module.

20. The system of claim 15, wherein the web services requester is further configured to receive, in response to the query, one or more web services providers satisfying the parameters of a selected strategy module from the web registry.

21. The system of claim 20 wherein the web services requester is further configured to select another predifined search module and determining whether the one or more web service providers satisfy parameters of the other predefined search module to identify a web services provider for the business process.

22. A computer implemented method for selecting a web services provider, comprising:
for a first business process, selecting a first subset of predefined strategy modules from a set of predefined strategy modules, wherein each predefined strategy module comprises:
(a) one or more search parameters; and
(b) a search strategy for each parameter to identify web services providers satisfying the parameter, wherein the search strategy comprises:
(i) a priority for the parameter; and
(ii) an action to be performed if the parameter is not satisfied by a given web services provider;
for a second business process, selecting a second set of predefined strategy modules from the set of predefined strategy modules, wherein one or more predefined strategy modules of the second set of predefined strategy modules are also included in the first set of predefined strategy modules; and
for each of the business processes, querying a web services registry for a web services provider based on the one or more parameters of respective selected subset of predefined strategy modules to identify one or more desired web services providers, wherein the web services registry comprises a list of web services providers and services provided by each web services provider, wherein the web services registry is a Universal Description, Discovery, and Integration registry.

23. The method of claim 22, wherein the action comprises one of:
- selecting a different web service provider if the parameter is not satisfied by the given web services provider; and
- ignoring the parameter if the parameter is not satisfied by the given web services provider.

24. The method of claim 22, further comprising, responsive to each query, receiving one or more web services providers satisfying the respective parameters of the respective selected subset of strategy modules from the web services registry.

* * * * *